US011972315B2

(12) United States Patent
Salatandre

(10) Patent No.: US 11,972,315 B2
(45) Date of Patent: Apr. 30, 2024

(54) APPARATUS FOR USE WITH A NFC TAG READER

(71) Applicant: Edgar Davin Salatandre, Toronto (CA)

(72) Inventor: Edgar Davin Salatandre, Toronto (CA)

( * ) Notice: Subject to any disclaimer, the term of this patent is extended or adjusted under 35 U.S.C. 154(b) by 0 days.

(21) Appl. No.: 17/851,911

(22) Filed: Jun. 28, 2022

(65) Prior Publication Data

US 2022/0327297 A1  Oct. 13, 2022

Related U.S. Application Data

(63) Continuation of application No. 17/070,687, filed on Oct. 14, 2020, now Pat. No. 11,403,472.

(60) Provisional application No. 62/941,822, filed on Nov. 28, 2019, provisional application No. 62/930,136, filed on Nov. 4, 2019.

(51) Int. Cl.
*G06K 7/10* (2006.01)
*G06K 19/073* (2006.01)

(52) U.S. Cl.
CPC ... *G06K 7/10297* (2013.01); *G06K 19/07318* (2013.01)

(58) Field of Classification Search
CPC ............. G06K 7/10297; G06K 19/07318
USPC .......................................................... 235/451
See application file for complete search history.

(56) References Cited

U.S. PATENT DOCUMENTS

| | | | | |
|---|---|---|---|---|
| 6,203,070 B1* | 3/2001 | Richardson | ............ | B42D 15/00 283/117 |
| 7,482,925 B2* | 1/2009 | Hammad | ......... | G06K 19/07327 235/382 |
| 8,344,958 B2* | 1/2013 | Artigue | ............ | G06K 19/07749 235/492 |
| 8,441,403 B2* | 5/2013 | Peters | .................... | B42D 25/00 343/866 |
| 8,604,995 B2* | 12/2013 | Hammad | ............. | H05K 5/0208 343/702 |
| 9,524,458 B2* | 12/2016 | Colby | .............. | G06K 19/07345 |
| 2014/0311636 A1* | 10/2014 | Jordan | ..................... | A45C 1/06 150/133 |
| 2016/0350641 A1* | 12/2016 | Schmid | ............ | G06K 19/07309 |

* cited by examiner

*Primary Examiner* — Ahshik Kim
(74) *Attorney, Agent, or Firm* — Head, Johnson, Kachigian & Wilkinson, PC

(57) ABSTRACT

The apparatus comprises: a pair of panel portions; a hinge portion defining an axis from which each of the panel portions extends, the hinge portion being coupled to each of the panel portions and adapted to permit pivotal movement of the panel portions relative to one another about the axis between a closed position wherein the panels overlay one another one another and an open position wherein the panels extend away from one another; a near field communication tag coupled to one of the panel portions; and a shield defined by RF blocking material coupled to the other of the panel portions. The tag and shield are positioned and adapted such that: the tag can be activated by the reader when the panels are in the open position; and the shield isolates the tag from the reader when the panels are in the closed position.

1 Claim, 1 Drawing Sheet

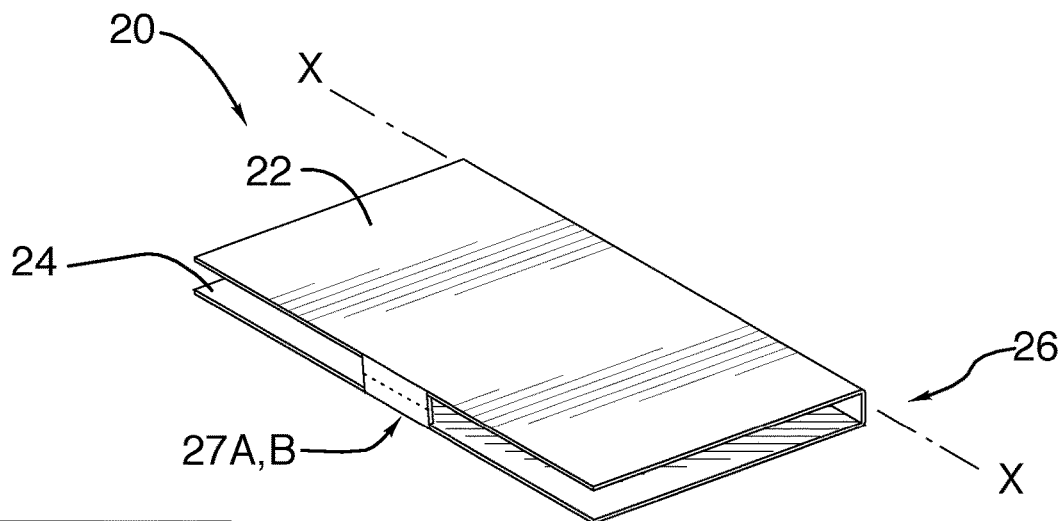
FIG.1
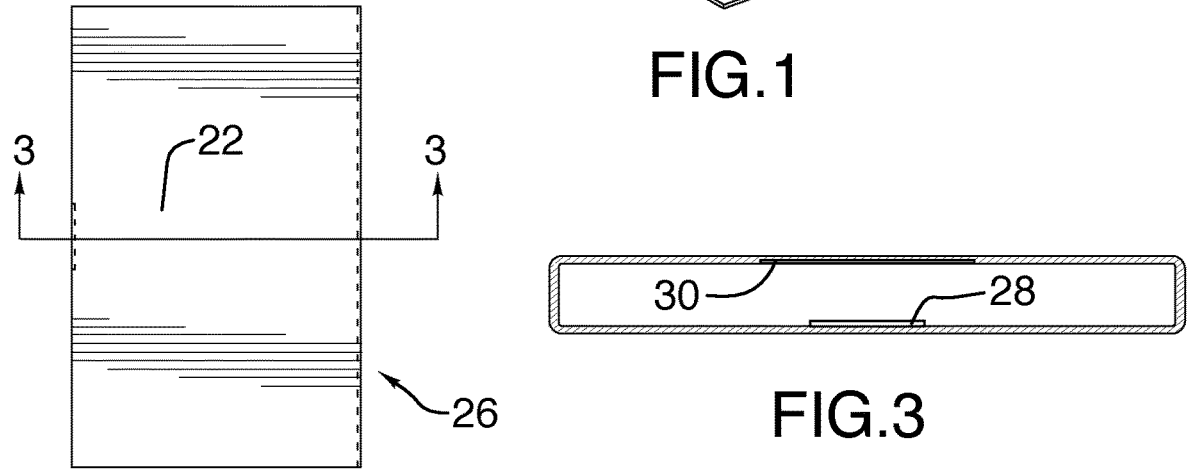
FIG.2
FIG.3
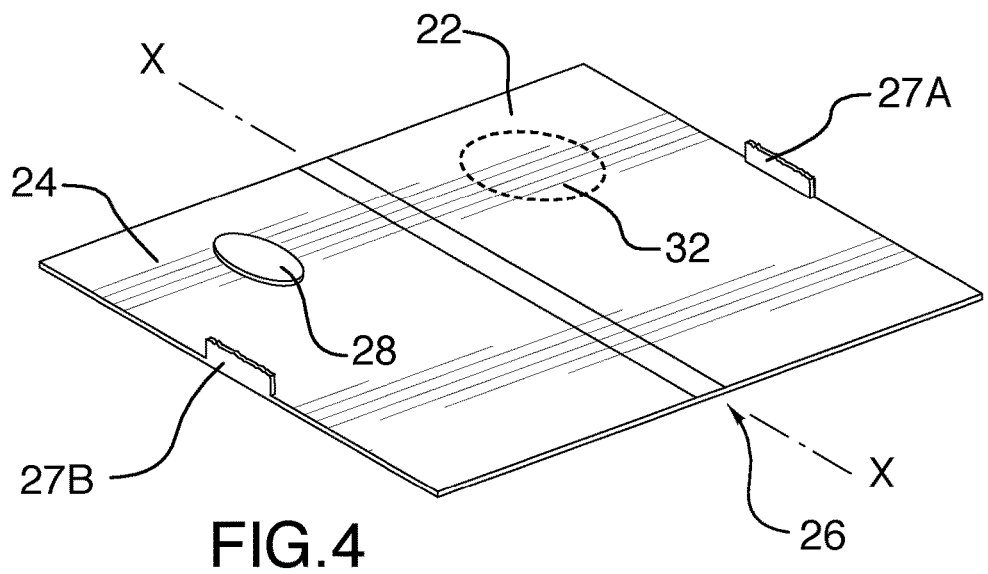
FIG.4

APPARATUS FOR USE WITH A NFC TAG READER

CROSS-REFERENCE TO RELATED APPLICATION

This application is a continuation application of U.S. patent application Ser. No. 17/070,687 filed Oct. 14, 2020 which claims the benefit of U.S. Provisional Patent Application Ser. No. 62/930,136, filed Nov. 4, 2019, and U.S. Provisional Patent Application Ser. No. 62/941,822, filed Nov. 28, 2019.

BACKGROUND OF THE INVENTION

1. Field of the Invention

The invention relates to the field of cards for greeting and similar purposes.

2. Prior Art

Near Field Communication [NFC] tags are small integrated circuits desired to store information for subsequent retrieval by NFC-enabled devices like smartphones and tablets which have found relatively little use in industry when viewed in the context of their significant functionality.

SUMMARY OF THE INVENTION

Forming one aspect of the invention is apparatus for use with an NFC tag reader.

This apparatus comprises: a pair of panel portions; a hinge portion defining an axis from which each of the panel portions extends, the hinge portion being coupled to each of the panel portions and adapted to permit pivotal movement of the panel portions relative to one another about the axis between a closed position wherein the panels overlay one another one another and an open position wherein the panels extend away from one another; a near field communication tag coupled to one of the panel portions; and a shield defined by RF blocking material coupled to the other of the panel portions, the tag and shield being positioned and adapted such that the tag can be activated by the reader when the panels are in the open position and the shield isolates the tag from the reader when the panels are in the closed position.

According to another aspect of the invention, in the closed position, the tag and the shield can be adjacent to one another and sandwiched between the panels.

According to another aspect of the invention, the panel portions can be in the closed position and coupled to one another by a frangible joint.

BRIEF DESCRIPTION OF THE DRAWINGS

FIG. 1 is a perspective view of apparatus according to an embodiment of the invention, wherein the panel portions are shown in a closed position and secured by the frangible joint;

FIG. 2 is a top view of the apparatus of FIG. 1;

FIG. 3 is a view along section 3-3 of FIG. 2; and

FIG. 4 is a perspective view of the apparatus of FIG. 1 wherein the joint is ruptured and the portions are shown in an open position.

DETAILED DESCRIPTION OF THE PREFERRED EMBODIMENTS

Apparatus 20 according to an embodiment of the invention is shown in FIG. 1 and will be seen to comprise a hinge portion 26, a pair of panel portions 22, 24, a frangible joint 27A,27B, a tag 28 and a shield 30.

The hinge portion 26 defines an axis from X-X which each of the panel portions 22,24 extends.

The panel portions 22, 24 are planar and disposed such that one 24 of the panels is overlaid by the other 22.

The tag 28 is a near field communication tag coupled to the one 24 of the panel portions and disposed interiorly of the pair of panel portions 22,24.

The shield is 30 is defined by RF blocking material and coupled to the other of the panels such that the tag is disposed adjacent the shield and thereby shielded from activation by tag readers.

The frangible joint 27A,B is disposed, relative to the panels, in opposing relation to the hinge and extends between said panels.

Upon rupture of the joint, the panels can be moved from the closed position shown in FIG. 1 to an open position shown in FIG. 2, wherein the tag 28 is visible to a conventional tag reader, such as a smart phone.

Persons of ordinary skill will appreciate that the foregoing has significant advantage.

- a recipient of the apparatus can have a fair measure of certainty that he or she is the first to tap the tag, which allows, for example, confidential information to be imparted to a recipient without the use of email in a secure manner; and
- even after the joint has been ruptured, the recipient can be assured that the tag will not be surreptitiously read merely by ensuring that the apparatus is stored and transported in the closed position.

Persons of ordinary skill will appreciate that many materials are suitable for use as RF blocking material, including but not limited to aluminum, alloy nickel and copper.

Whereas a specific embodiment is illustrated, variations are possible. Accordingly, the invention should be understood to be limited only by the accompanying claims, purposively construed.

What is claimed is:

1. A card apparatus for use with an NFC tag reader, the apparatus comprising:
   a pair of panel portions, each defining part of a card and extending from an axis, the panel portions being movable relative to one another about the axis between a closed position wherein the panels overlay one another one another and an open position wherein the panels extend away from one another, where the panels are coupled to one another by a hinge;
   a near field communication tag coupled to one of the panel portions;
   a shield defined by RF blocking material coupled to the other of the panel portions, the tag and shield being positioned and adapted such that the tag can be activated by the reader when the panels are in the open position and the shield isolates the tag from the reader when the panels are in the closed position; and
   wherein, in the closed position, the tag and the shield are adjacent to one another and sandwiched between the panels and wherein the panel positions are in the closed position and coupled to one another by a frangible joint and the hinge, where the frangible joint restrains the panels in the closed position from moving to the open position; and
   wherein, in the open position, the panels are coupled to one another by the hinge but not the frangible joint.

* * * * *